US012619719B2

(12) United States Patent
Hirano et al.

(10) Patent No.: US 12,619,719 B2
(45) Date of Patent: May 5, 2026

(54) MONITORING SYSTEM AND CONTROL METHOD

(71) Applicant: Panasonic Automotive Systems Co., Ltd., Kanagawa (JP)

(72) Inventors: Ryo Hirano, Kanagawa (JP);
Yoshiharu Imamoto, Kanagawa (JP);
Shoichiro Sekiya, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 34 days.

(21) Appl. No.: 18/639,560

(22) Filed: Apr. 18, 2024

(65) Prior Publication Data

US 2024/0362325 A1      Oct. 31, 2024

(30) Foreign Application Priority Data

Apr. 25, 2023      (JP) ................................. 2023-071248

(51) Int. Cl.
*G06F 21/55* (2013.01)
(52) U.S. Cl.
CPC .......... *G06F 21/554* (2013.01); *G06F 21/552* (2013.01)
(58) Field of Classification Search
None
See application file for complete search history.

(56) References Cited

U.S. PATENT DOCUMENTS

| | | | |
|---|---|---|---|
| 2016/0162274 A1 | 6/2016 | Dokai | |
| 2021/0141894 A1 | 5/2021 | Kim | |
| 2021/0237665 A1 | 8/2021 | Tamura et al. | |
| 2022/0279005 A1* | 9/2022 | Torisaki | ........... H04L 12/40006 |

FOREIGN PATENT DOCUMENTS

| | | |
|---|---|---|
| JP | 2016-110461 A | 6/2016 |
| JP | 2020-520037 A | 7/2020 |
| JP | 7113337 B2 | 8/2022 |

OTHER PUBLICATIONS

Notice of Reasons for Refusal issued in Japanese Counterpart Patent Appl. No. 2023-071248, dated Mar. 26, 2024, along with an English translation thereof.

* cited by examiner

*Primary Examiner* — Jeffrey C Pwu
*Assistant Examiner* — Mayasa A. Shaawat
(74) *Attorney, Agent, or Firm* — GREENBLUM & BERNSTEIN, P.L.C.

(57) ABSTRACT

An integrated ECU includes: a host virtual machine; an anomaly detector that detects a security anomaly in the host virtual machine; a service list storage that stores a service list indicating a list of a plurality of services executed by the in-vehicle system; a determiner that determines a specific service from among the plurality of services indicated in the service list when the anomaly detector detects the security anomaly, the specific service being a service which needs to be stopped or needs a change in a setting in order to resolve the security anomaly; and an anomaly countermeasures unit that executes an anomaly countermeasures process of stopping the specific service or changing the setting of the specific service, based on a determination result of the determiner.

9 Claims, 14 Drawing Sheets

| Detection result number | Detection result | Details of detection result |
|---|---|---|
| 1 | Network IDS | Virtual machine number, communication ID |
| 2 | Host IDS | Virtual machine number, process ID |
| 3 | Host IDS | Virtual machine number, process ID |

FIG. 4B

| Vehicle state number | Vehicle state |
|---|---|
| 1 | Stopped |
| 2 | Running |
| 3 | Engine off |

FIG. 4C

| Anomaly countermeasures count |
|---|
| 1 |

FIG. 5

| Service name | Virtual machine number | Priority degree | Category | Vehicle state | Necessity of reboot | Set value |
|---|---|---|---|---|---|---|
| Out-of-vehicle communication | 2 | 1 | Network | — | Unnecessary | IP address |
| Device connection | 2 | 2 | Device | — | Unnecessary | — |
| Internal communication | 1, 2, 3 | 3 | Network | NG during being stopped / NG during running | System | — |
| In-vehicle communication | 1 | 4 | Network | NG during being stopped / NG during running | System | — |
| Software update | 1, 2, 3 | 1 | Vehicle function | — | Unnecessary | — |
| Navi | 2 | 2 | Vehicle function | — | Relevant virtual machine | — |
| Meter | 1 | 3 | Vehicle safety function | NG during running | Relevant virtual machine | — |
| Vehicle control | 1 | 4 | Vehicle safety function | NG during being stopped / NG during running | Relevant virtual machine | — |
| Firewall | 1, 2, 3 | 1 | Security | — | Unnecessary | Rule / No need to stop |
| Access control | 1, 2, 3 | 2 | Security | — | Unnecessary | Rule / No need to stop |
| Intrusion detection and defense | 1, 2, 3 | 3 | Security | — | Unnecessary | Rule / No need to stop |
| Security (cryptography and signature) | 1, 2, 3 | 4 | Security | — | Unnecessary | — |

FIG. 6

| Anomaly countermeasures count | Anomaly countermeasures process |
|---|---|
| 0 | Change settings of services of priority degree 1 |
| 1 | Stop services of priority degree 1 |
| 2 | Change settings of services of priority degree 2 |
| 3 | Stop services of priority degree 2 |
| 4 | Change settings of services of priority degree 3 |
| 5 | Stop services of priority degree 3 |
| 6 | Change settings of services of priority degree 4 |
| 7 | Stop services of priority degree 4 |
| ... | ... |

FIG. 8

| Anomaly countermeasures count | Virtual machine number | Priority degree | Service name | Change setting / Stop |
|---|---|---|---|---|
| 0 | 2 | 1 | Out-of-vehicle communication | Change setting |
| 0 | 1, 2, 3 | 1 | Firewall | Change setting |
| 1 | 2 | 1 | Out-of-vehicle communication | Stop |
| 1 | 1, 2, 3 | 1 | Firewall | Change setting |
| 2 | 2 | 2 | Access control | Change setting |
| 3 | 2 | 2 | Device connection | Stop |
| 3 | 2 | 2 | Navi | Stop |
| 3 | 2 | 2 | Access control | Change setting |
| ... | ... | ... | ... | ... |

FIG. 14

| Anomaly countermeasures count | Anomaly countermeasures process |
|---|---|
| 0 | Stop all services and then sequentially start services of priority degree 4. After predetermined time period, sequentially start services of priority degree 3. After predetermined time period, sequentially start services of priority degree 2. After predetermined time period, sequentially start services of priority degree 1. |
| 1 | Stop all services and then sequentially start services, except services of priority degree M, in ascending order of priority degree. |
| ... | ... |

MONITORING SYSTEM AND CONTROL METHOD

CROSS REFERENCE TO RELATED APPLICATIONS

The present application is based on and claims priority of Japanese Patent Application No. 2023-071248 filed on Apr. 25, 2023.

FIELD

The present disclosure relates to a monitoring system and a control method.

BACKGROUND

Monitoring systems have been known that monitor an operating system provided in a vehicle for the occurrence of security anomalies caused by attack on the operating system from the outside (e.g., see PTL 1).

CITATION LIST

Patent Literature

PTL 1: Japanese Patent No. 7113337

SUMMARY

However, the above conventional monitoring systems can be improved upon.

In view of this, the present disclosure provides a monitoring system and a control method capable of improving upon the above related art.

In accordance with an aspect of the present disclosure, a monitoring system which monitors an in-vehicle system provided to a vehicle and is included in the in-vehicle system includes: an operating system; an anomaly detector that detects a security anomaly in the operating system; a first storage that stores a service list indicating a list of a plurality of services executed by the in-vehicle system; a determiner that determines a specific service from among the plurality of services indicated in the service list when the anomaly detector detects the security anomaly, the specific service being a service which needs to be stopped or needs a change in a setting in order to resolve the security anomaly; and an anomaly countermeasures unit that executes an anomaly countermeasures process of stopping the specific service or changing the setting of the specific service, based on a determination result of the determiner.

General or specific aspects of the present disclosure may be implemented to a system, a device, a method, an integrated circuit, a computer program, a computer-readable recording medium such as a Compact Disc-Read Only Memory (CD-ROM), or any given combination thereof.

The monitoring system or the like according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a conceptual diagram illustrating an overview of an in-vehicle system according to an embodiment.

FIG. 4A is a diagram illustrating an example of detection result information according to the embodiment.

FIG. 4B is a diagram illustrating an example of vehicle state information according to the embodiment.

FIG. 4C is a diagram illustrating an example of an anomaly countermeasures count according to the embodiment.

FIG. 5 is a diagram illustrating an example of a service list according to the embodiment.

FIG. 6 is a diagram illustrating an example of an anomaly countermeasures table according to the embodiment.

FIG. 8 is a diagram illustrating an example of a to-be-stopped service list according to the embodiment.

FIG. 14 is a diagram illustrating an example of the anomaly countermeasures table according to a variation of the embodiment.

DESCRIPTION OF EMBODIMENT

Figure 2:
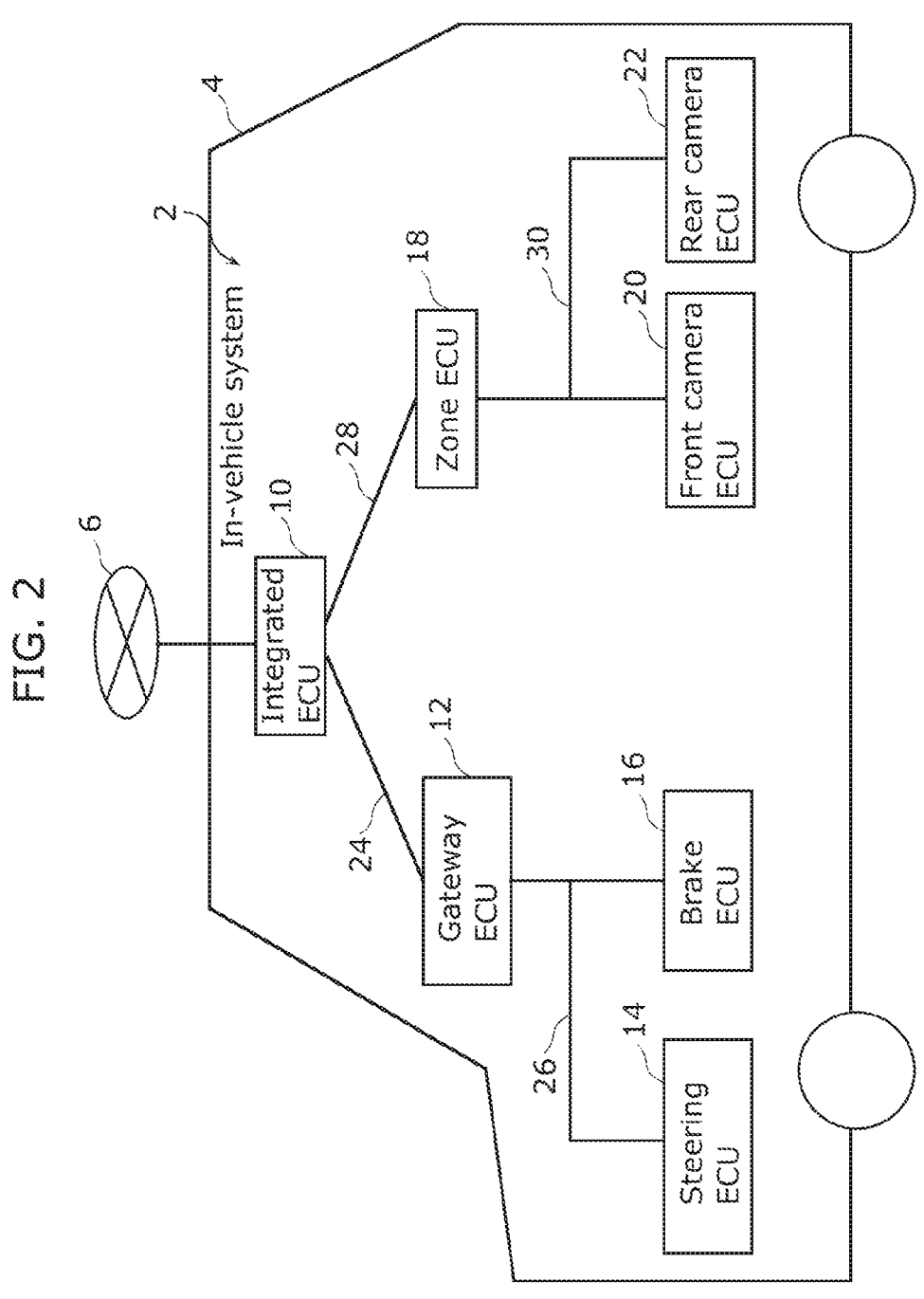
FIG. 2 is a block diagram illustrating an overview of the in-vehicle system according to the embodiment.

Underlying Knowledge Forming Basis of the Present Disclosure

The inventors have found that the techniques mentioned in the Background involve the following inconvenience.

In the above conventional monitoring systems, functions of a vehicle may be significantly restricted by executing an anomaly countermeasures process for resolving a security anomaly.

In order to solve the above problem, in accordance with an aspect of the present disclosure, a monitoring system which monitors an in-vehicle system provided to a vehicle and is included in the in-vehicle system includes: an operating system; an anomaly detector that detects a security anomaly in the operating system; a first storage that stores a service list indicating a list of a plurality of services executed by the in-vehicle system; a determiner that determines a specific service from among the plurality of services indicated in the service list when the anomaly detector detects the security anomaly, the specific service being a service which needs to be stopped or needs a change in a setting in order to resolve the security anomaly; and an anomaly countermeasures unit that executes an anomaly countermeasures process of stopping the specific service or changing the setting of the specific service, based on a determination result of the determiner.

According to this aspect, upon detection of a security anomaly by the anomaly detector, the determiner determines, from among the plurality of services indicated in the service list, a specific service that needs to be stopped or needs a change in a setting in order to resolve the security anomaly. The anomaly countermeasures executer thus executes an anomaly countermeasures process of stopping, or changing settings of, the minimum number of specific services, for example those likely to be vulnerable. This can minimize the influences of executing the anomaly countermeasures process on functions of the vehicle.

It is possible that the monitoring system may further include: a counter that counts an anomaly countermeasures number that is a total number of times that the anomaly countermeasures unit executed has the anomaly countermeasures process in a predetermined time period, wherein the determiner determines the specific service from among the plurality of services indicated in the service list, based on the anomaly countermeasures number.

According to this aspect, it is possible to perform an anomaly countermeasures process of stopping a specific service or changing a setting of a specific service, for example in decreasing order of likelihood of being vulnerable, as the anomaly countermeasures count increases.

It is possible that the monitoring system may further include: a second storage that stores an anomaly countermeasures table indicating a correspondence between the anomaly countermeasures number and the anomaly countermeasures process, wherein the determiner determines the specific service from among the plurality of services indicated in the service list, based on the anomaly countermeasures process associated with the anomaly countermeasures number counted by the counter with reference to the anomaly countermeasures table.

According to this aspect, it is possible to perform an anomaly countermeasures process of stopping a specific service or changing a setting of a specific service, for example in decreasing order of likelihood of being vulnerable, as the anomaly countermeasures count increases.

It is possible that the monitoring system further include: an obtainer that obtains vehicle state information indicating a state of the vehicle, wherein the determiner determines the specific service from among the plurality of services indicated in the service list, based on the anomaly countermeasures number and the vehicle state information.

According to this aspect, the specific service that needs to be stopped or needs a change in a setting in order to resolve the security anomaly can be determined based on the vehicle state information as well.

In the vehicle state information, it is possible that, as the state of the vehicle, whether vehicle is running or stopping, in the service list, each of the plurality of services is associated with whether the service is stoppable while the vehicle is running or stopping, and based on the anomaly countermeasures number and the vehicle state information, the determiner does not select as the specific service a service not stoppable while the vehicle is running or stopping from among the plurality of services indicated in the service list.

According to this aspect, services not stoppable while the vehicle is running or stopped are not selected as the specific service that needs to be stopped or needs a change in a setting. This can minimize influences on the in-vehicle system.

It is possible that the monitoring system further include: a notifier that notifies that the anomaly countermeasures unit stops the specific service or changes the setting of the specific service, when the anomaly countermeasures unit stops the specific service or changes the setting of the specific service.

According to this aspect, an external monitoring server, for example, can recognize that the specific service is stopped or changed in a setting.

In the vehicle state information, it is possible that when the security anomaly is resolved, the notifier further notifies details of the anomaly countermeasures process executed by the anomaly countermeasures unit.

According to this aspect, an external monitoring server, for example, can recognize the details of the anomaly countermeasures process that has resolved the security anomaly as a result of being executed by the anomaly countermeasures executer. This facilitates analyzing the cause of the security anomaly.

In the vehicle state information, it is possible that when the anomaly detector detects the security anomaly, the anomaly countermeasures unit generates a replicated operating system that is a replication of the operating system in which the security anomaly has been detected.

According to this aspect, upon attack on the operating system, the replicated operating system generated as a replica of the original operating system can take over the role of the target of the attack. Meanwhile, settings (e.g., the IP address) of the original operating system can be changed to reduce the possibility of being attacked.

In the vehicle state information, it is possible that, in the service list, each of the plurality of services is associated with a priority degree, and that the determiner determines the specific service from among the plurality of services indicated in the service list, based on the priority degree.

According to this aspect, services likely to be vulnerable, for example, can be given high priority in determining the specific service from among the plurality of services indicated in the service list.

In the vehicle state information, it is possible that, in the service list, the plurality of services are classified into categories including at least one of a network, a device, a vehicle function, a vehicle safety function, or security.

According to this aspect, services in the category relevant to the details of the security anomaly, for example, can be given high priority in determining the specific service from among the plurality of services indicated in the service list.

In accordance with another aspect of the present disclosure, a control method performed by a monitoring system which monitors an in-vehicle system provided to a vehicle and is included in the in-vehicle system includes: (a) detecting a security anomaly in an operating system included in the monitoring system; (b) determining, when the security anomaly is detected in (a), a specific service from among a plurality of services indicated in a service list indicating a list of the plurality of services executed by the in-vehicle system, the specific service being a service which needs to be stopped or needs a change in a setting in order to resolve the security anomaly; and (c) executing an anomaly countermeasures process of stopping the specific service or changing the setting of the specific service, based on a determination result of (b).

This aspect, as with the monitoring system according to the first aspect, can minimize the influences of executing the anomaly countermeasures process on functions of the vehicle.

General or specific aspects of the present disclosure may be implemented to a system, a device, a method, an integrated circuit, a computer program, a computer-readable recording medium such as a Compact Disc-Read Only Memory (CD-ROM), or any given combination thereof.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

1. Overview of In-Vehicle System

Figure 1:
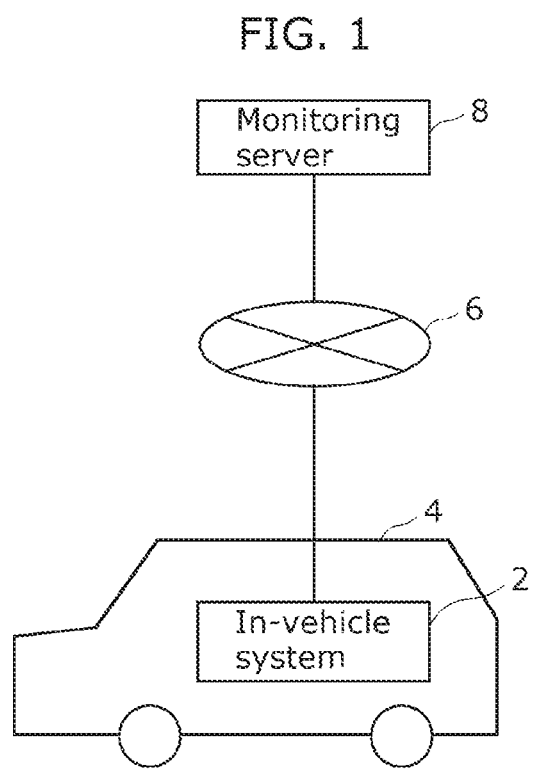

Now, with reference to FIGS. 1 and 2, an overview of in-vehicle system 2 according to an embodiment will be described. FIG. 1 is a conceptual diagram illustrating an overview of in-vehicle system 2 according to the embodiment. FIG. 2 is a block diagram illustrating an overview of in-vehicle system 2 according to the embodiment.

As illustrated in FIG. 1, in-vehicle system 2 according to the embodiment is applied to a self-driving system in vehicle 4, for example an automobile, used for automatic control of driving operations of vehicle 4, such as acceleration and deceleration, steering, and braking, through an advanced driver assistance system (ADAS).

In-vehicle system 2 can communicate with monitoring server 8 via external network 6 such as the Internet. In-vehicle system 2 monitors for the occurrence of a security anomaly in in-vehicle system 2 and notifies monitoring server 8 of the result of the monitoring via external network 6.

Monitoring server 8 is located in a security monitoring center, for example. Receiving the notification from in-vehicle system 2, monitoring server 8 recognizes the state of the occurrence of a security anomaly in individual vehicle 4 and provides advice, such as advice about countermeasures against the security anomaly.

As illustrated in FIG. 2, in-vehicle system 2 includes general electronic control unit (ECU) 10, gateway ECU 12, steering ECU 14, brake ECU 16, zone ECU 18, front camera ECU 20, and rear camera ECU 22.

Integrated ECU 10 is communicatively connected with gateway ECU 12 via controller area network (CAN) 24. Gateway ECU 12, steering ECU 14, and brake ECU 16 are communicatively connected with each other via CAN 26.

Integrated ECU 10 is also communicatively connected with zone ECU 18 via Ethernet (trademark) 28. Zone ECU 18, front camera ECU 20, and rear camera ECU 22 are communicatively connected with each other via Ethernet (trademark) 30. Integrated ECU 10 is further communicatively connected with monitoring server 8 (see FIG. 1) via external network 6.

Integrated ECU 10 performs (a) communication control for transmitting and receiving messages via external network 6, CAN 24, and Ethernet 28, (b) vehicle control for instructing gateway ECU 12 and zone ECU 18, via CAN 24 and Ethernet 28, to control vehicle 4, and (c) output of video to an infotainment system and an instrument panel. Integrated ECU 10 also monitors for the occurrence of a security anomaly (e.g., an unauthorized access) in in-vehicle system 2 and notifies monitoring server 8 of the result of the monitoring. That is, integrated ECU 10 is an example of a monitoring system for monitoring in-vehicle system 2 provided in vehicle 4.

Gateway ECU 12 transfers messages exchanged between integrated ECU 10 and steering ECU 14 and brake ECU 16.

Steering ECU 14 controls steering performed with a steering wheel provided in vehicle 4.

Brake ECU 16 controls the driving of a brake provided in vehicle 4.

In addition to steering ECU 14 and brake ECU 16, in-vehicle system 2 uses ECUs for control of components of vehicle 4 such as the engine and the body, thereby performing various sorts of control of vehicle 4 such as running, turning, and stopping.

Zone ECU 18 transfers messages exchanged between integrated ECU 10 and front camera ECU 20 and rear camera ECU 22.

Front camera ECU 20 obtains video of the area ahead of vehicle 4 captured by a front camera provided on the front of vehicle 4.

Rear camera ECU 22 obtains video of the area behind vehicle 4 captured by a rear camera provided on the rear of vehicle 4.

2. Functional Configuration of Integrated ECU

Figure 3:
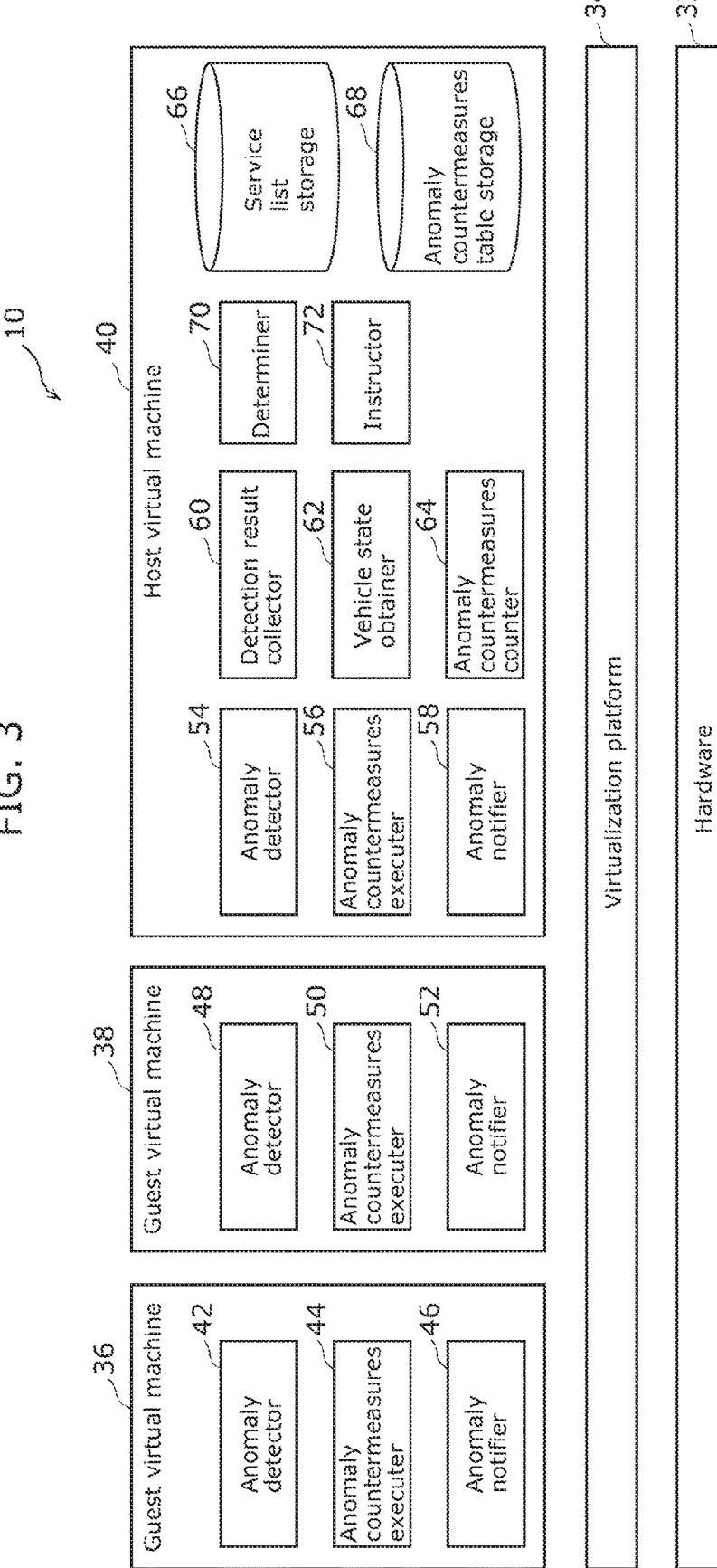
FIG. 3 is a block diagram illustrating the functional configuration of an integrated ECU according to the embodiment.
Figure 7:
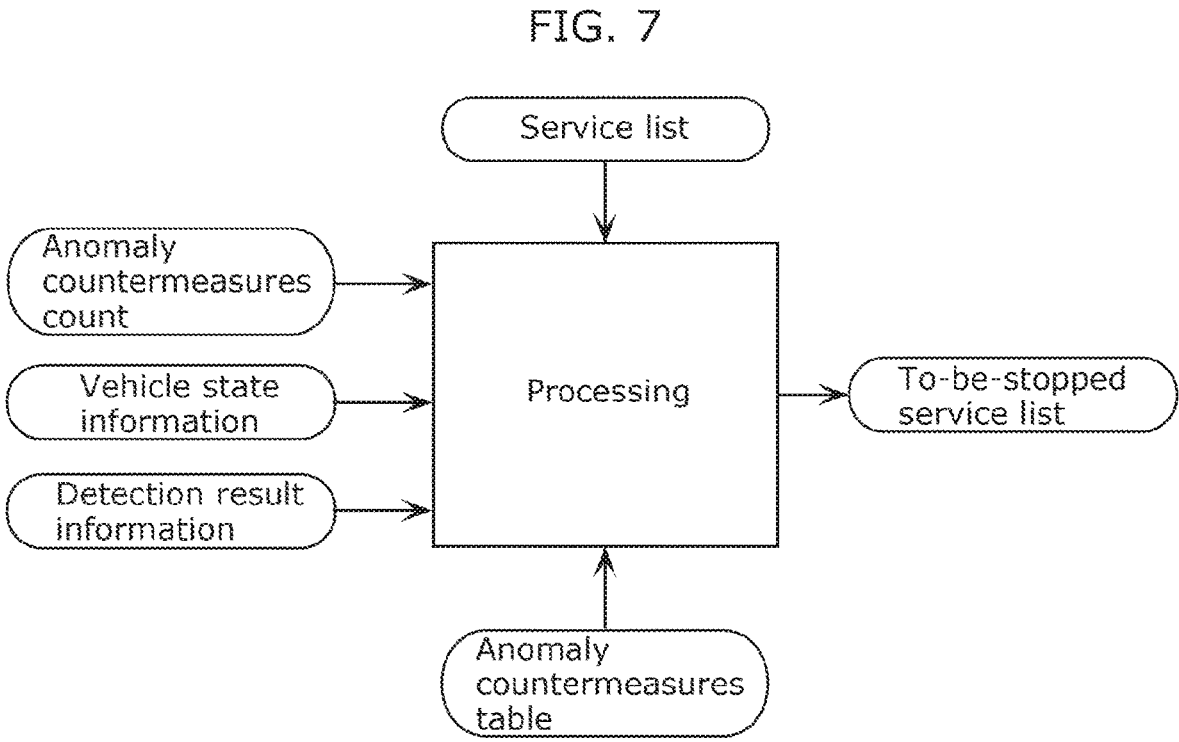
FIG. 7 is a diagram for describing processing in a determiner of the integrated ECU according to the embodiment.

Now, with reference to FIGS. 3 to 8, the functional configuration of integrated ECU 10 (the monitoring system) will be described. FIG. 3 is a block diagram illustrating the functional configuration of integrated ECU 10 according to the embodiment. FIG. 4A is a diagram illustrating an example of detection result information according to the embodiment. FIG. 4B is a diagram illustrating an example of vehicle state information according to the embodiment. FIG. 4C is a diagram illustrating an example of an anomaly countermeasures count according to the embodiment. FIG. 5 is a diagram illustrating an example of a service list according to the embodiment. FIG. 6 is a diagram illustrating an example of an anomaly countermeasures table according to the embodiment. FIG. 7 is a diagram for describing processing in determiner 70 of integrated ECU 10 according to the embodiment. FIG. 8 is a diagram illustrating an example of a to-be-stopped service list according to the embodiment.

As illustrated in FIG. 3, as the functional configuration, integrated ECU 10 includes hardware 32, virtualization platform 34, guest virtual machine 36 (an example of an operating system), guest virtual machine 38 (an example of the operating system), and host virtual machine 40 (an example of the operating system).

Hardware 32, which may include processors having central processing units (CPUs) or ECUs for example, provides an execution environment for a plurality of computer programs. Hardware 32 may be implemented by a single processor or multiple processors.

Virtualization platform 34 is virtualization software that is executed on hardware 32 to control execution of guest virtual machines 36 and 38 and host virtual machine 40. Virtualization platform 34 enables virtualizing a plurality of different operating systems (guest virtual machines 36 and 38 and host virtual machine 40) on the single unit of hardware 32. Virtualization platform 34 may be a Type-1 hypervisor that directly operates on hardware 32, or may be a Type-2 hypervisor that operates on an operating system directly operating on hardware 32. Virtualization platform 34 may also be a container. Although integrated ECU 10 in the embodiment is implemented using virtualization platform 34 in a virtual environment, integrated ECU 10 is not limited to this and may be implemented using real hardware.

Guest virtual machine 36 is an operating system, for example Linux (trademark) or Android (trademark), operating on virtualization platform 34. Guest virtual machine 36 includes anomaly detector 42, anomaly countermeasures executer 44, and anomaly notifier 46 (an example of a notifier). Guest virtual machine 36 is assigned the virtual machine number "1" for identifying guest virtual machine 36.

Anomaly detector 42 detects a security anomaly in guest virtual machine 36 by monitoring the behavior and the communication states of the ECUs in in-vehicle system 2. Anomaly detector 42 is implemented by, for example, a network IDS (NIDS: Network-based Intrusion Detection System) or a host IDS (HIDS: Host-based Intrusion Detection System).

Anomaly countermeasures executer 44 executes, if a security anomaly is detected by anomaly detector 42, an anomaly countermeasures process (to be described below) for resolving the detected security anomaly, based on an anomaly countermeasures instruction (to be described below) from host virtual machine 40.

Anomaly notifier 46 notifies, if a security anomaly is detected by anomaly detector 42, monitoring server 8 (see FIG. 1) of information. For example, the information indicates the details of the detected security anomaly, the details of an anomaly countermeasures process, and that specific services (to be described below) are stopped or changed in settings. Upon resolution of the security anomaly, anomaly notifier 46 notifies monitoring server 8 of information, such as information indicating that the security anomaly has been resolved, the details of the anomaly countermeasures process, and that the specific services have been stopped or changed in settings.

Although anomaly notifier 46 in the embodiment provides the notification of the above information to monitoring server 8, the notification is not limited to this. In another example, the notification may be provided to the driver of vehicle 4, or to vehicles or pedestrians near vehicle 4. For example, to notify the driver of vehicle 4 of the information, anomaly notifier 46 may display a message on a display provided in the interior of vehicle 4 or turn on a lamp disposed on a button provided in the interior of vehicle 4. This also applies to anomaly notifiers 52 and 58 to be described below.

Guest virtual machine 38 is an operating system, for example Linux (trademark) or Android (trademark), operating on virtualization platform 34. Guest virtual machine 38 includes anomaly detector 48, anomaly countermeasures executer 50, and anomaly notifier 52 (an example of the notifier). Guest virtual machine 38 is assigned the virtual machine number "2" for identifying guest virtual machine 38.

Anomaly detector 48 detects a security anomaly in guest virtual machine 38 by monitoring the behavior and the communication states of the ECUs in in-vehicle system 2. Anomaly detector 48 is implemented by, for example, a network IDS or a host IDS.

Anomaly countermeasures executer 50 executes, if a security anomaly is detected by anomaly detector 48, an anomaly countermeasures process for resolving the detected security anomaly, based on an anomaly countermeasures instruction from host virtual machine 40.

Anomaly notifier 52 notifies, if a security anomaly is detected by anomaly detector 48, monitoring server 8 of information. For example, the information indicates the details of the detected security anomaly, the details of an anomaly countermeasures process, and that specific services are stopped or changed in settings. Upon resolution of the security anomaly, anomaly notifier 52 notifies monitoring server 8 of information that the security anomaly has been resolved.

Host virtual machine 40 is an operating system, for example Linux (trademark) or Android (trademark), operating on virtualization platform 34. Host virtual machine 40 includes anomaly detector 54, anomaly countermeasures executer 56, anomaly notifier 58 (an example of the notifier), detection result collector 60, vehicle state obtainer 62 (an example of an obtainer), anomaly countermeasures counter 64 (an example of a counter), service list storage 66 (an example of a first storage), anomaly countermeasures table storage 68 (an example of a second storage), determiner 70, and instructor 72. Host virtual machine 40 is assigned the virtual machine number "3" for identifying host virtual machine 40.

Anomaly detector 54 detects a security anomaly in host virtual machine 40 by monitoring the behavior and the communication states of the ECUs in in-vehicle system 2. Anomaly detector 54 is implemented by, for example, a network IDS or a host IDS.

Anomaly countermeasures executer 56 executes, if a security anomaly is detected by anomaly detector 54, an anomaly countermeasures process for resolving the detected security anomaly, based on an anomaly countermeasures instruction from instructor 72.

Anomaly notifier 58 notifies, if a security anomaly is detected by anomaly detector 54, monitoring server 8 of information. For example, the information indicates the details of the detected security anomaly, the details of an anomaly countermeasures process, and that specific services are stopped or changed in settings. Upon resolution of the security anomaly, anomaly notifier 58 notifies monitoring server 8 of information that the security anomaly has been resolved.

Detection result collector 60 collects information indicating the result of detection by each of anomaly detectors 42, 48, and 54 (hereafter referred to as "detection result information"). For example, the detection result information includes (a) the virtual machine number of a virtual machine in which a security anomaly has been detected, (b) the type (network IDS or host IDS) of the anomaly detector that has detected the security anomaly, and (c) the details of the security anomaly. Detection result collector 60 maintains the collected detection result information as a data table, for example as illustrated in FIG. 4A.

Vehicle state obtainer 62 obtains information indicating the state of vehicle 4 (hereafter referred to as "vehicle state information") from, for example, gateway ECU 12 and zone ECU 18. For example, the vehicle state information includes (a) the running state of vehicle 4 (running or stopped) and (b) the operation state of the engine of vehicle 4 (ON or OFF). Vehicle state obtainer 62 maintains the obtained vehicle state information as a data table, for example as illustrated in FIG. 4B. In addition to (a) and (b) above, the vehicle state information may also include, for example, (c) the autocruise control state, (d) the self-driving state, (e) the ON/OFF state of the ignition, (f) the ON/OFF state of accessories, (g) the Internet connection state, and (h) global positioning system (GPS) information.

Anomaly countermeasures counter 64 counts the number of times anomaly countermeasures executers 44, 50, and 56 execute anomaly countermeasures processes in a predetermined time period (e.g., in the past hour) (hereafter referred to as an "anomaly countermeasures count"). Each time any of anomaly countermeasures executers 44, 50, and 56 executes an anomaly countermeasures process, anomaly countermeasures counter 64 increments the anomaly countermeasures count by one. Anomaly countermeasures counter 64 maintains the counted anomaly countermeasures count as a data table, for example as illustrated in FIG. 4C. Anomaly countermeasures counter 64 may also count the anomaly countermeasures count for each security anomaly type.

Service list storage 66 is nonvolatile memory that stores a service list. The service list, which may be a data table as illustrated in FIG. 5 for example, is a list of a plurality of services (functions) executed in in-vehicle system 2. As illustrated in FIG. 5, the service list associates Service name, Virtual machine number, Priority degree, Category, Vehicle state, Necessity of reboot, and Set value, with each other.

"Service name" in the service list indicates the names of services executed in in-vehicle system 2.

"Out-of-vehicle communication" is a service necessary for communication with the outside of vehicle 4, for example Wi-Fi (trademark), Bluetooth (trademark), wireless Internet communication, and encrypted communication. "Device connection" is a service necessary for communication with external devices, for example universal serial bus (USB) and Bluetooth (trademark). "Internal communication" is a service necessary for, for example, communication between virtual machines, communication with hypervisors (hypercall), and communication with TrustZone (trademark) (Secure Monitor Call).

"In-vehicle communication" is a service necessary for communication for controlling vehicle 4, for example CAN, CAN-FD (CAN with Flexible Data Rate), FlexRay (trademark), and Ethernet (trademark). "Software update" is a service necessary for updating software. "Navi" is a service necessary for, for example, navigation functions and playing music and the radio. "Meter" is a service necessary for displaying items such as the vehicle speed and alerts.

"Vehicle control" is a service necessary for various sorts of control of vehicle 4, for example running, turning, and stopping. "Firewall" is a service necessary for, for example, network filtering. "Access control" is a service necessary for, for example, access control for processes. "Intrusion detection and defense" is a service necessary for, for example, detecting and defending against security anomalies. "Security (cryptography and signature)" is a service necessary for, for example, a security function based on TrustZone (trademark).

"Virtual machine number" in the service list indicates the virtual machine numbers (e.g., 1, 2, and 3) of the virtual machines affected by stopping each service.

"Priority degree" in the service list indicates numerical values indicating the order of priority in stopping services or changing their settings. For example, the priority degrees are represented as the values 1 to 4 such that smaller values mean higher priority (i.e., the greater likelihood that the services are vulnerable).

"Category" in the service list indicates service types, for example network, device, vehicle function, vehicle safety function, and security.

"Vehicle state" in the service list indicates the state of vehicle 4 (running or stopped) in which each service is not stoppable. For example, the vehicle state "NG during running" corresponding to the service name "Meter" means that the service of "Meter" is not stoppable while vehicle 4 is running. The vehicle state "–" means that the service is stoppable irrespective of the state of vehicle 4.

"Necessity of reboot" in the service list indicates whether stopping each service requires reboot. As an example, "Unnecessary" means that stopping the service does not require reboot. As another example, "System" means that stopping the service requires rebooting integrated ECU 10 as a whole. As still another example, "Relevant virtual machine" means that stopping the service requires rebooting only the virtual machine in which a security anomaly has been detected.

"Set value" in the service list indicates settings to be changed if services need changes in settings. As an example, the set value "IP address" corresponding to the service name "Out-of-vehicle communication" means that the anomaly countermeasures process is to change an IP address setting of the service of "Out-of-vehicle communication." As another example, the set value "Rule/No need to stop" corresponding to the service name "Firewall" means that the anomaly countermeasures process is to change a rule setting of the service of "Firewall" (e.g., a rule is changed so that a specific IP address is dropped), and that stopping the service is not required.

Anomaly countermeasures table storage 68 is nonvolatile memory that stores an anomaly countermeasures table. The anomaly countermeasures table is a data table indicating the correspondences between anomaly countermeasures counts and anomaly countermeasures processes, for example as illustrated in FIG. 6.

As illustrated in FIG. 6, as an example, the first row in the anomaly countermeasures table associates the anomaly countermeasures count "0" with the anomaly countermeasures process "Change settings of services of priority degree 1." As another example, the second row in the anomaly countermeasures table associates the anomaly countermeasures count "1" with the anomaly countermeasures process "Stop services of priority degree 1." As still another example, the third row in the anomaly countermeasures table associates the anomaly countermeasures count "2" with the anomaly countermeasures process "Change settings of services of priority degree 2." As yet another example, the fourth row in the anomaly countermeasures table associates the anomaly countermeasures count "3" with the anomaly countermeasures process "Stop services of priority degree 2." Thus, the anomaly countermeasures table specifies an anomaly countermeasures process of stopping services or changing their settings, for example in decreasing order of likelihood of being vulnerable, as the anomaly countermeasures count increases.

Determiner 70 obtains, upon detection of a security anomaly by any of anomaly detectors 42, 48, and 54, the detection result information from detection result collector 60, the vehicle state information from vehicle state obtainer 62, and the anomaly countermeasures count from anomaly countermeasures counter 64. Based on the detection result information, the vehicle state information, and the anomaly countermeasures count, determiner 70 refers to the service list and the anomaly countermeasures table to determine, from among the plurality of services indicated in the service list, specific services that need to be stopped or need changes in settings in order to resolve the security anomaly. Determiner 70 outputs a to-be-stopped service list, which is a list of the specific services that need to be stopped or need changes in settings. Thus, as illustrated in FIG. 7, determiner 70 performs the processing of outputting the to-be-stopped service list based on input of the detection result information, the vehicle state information, the anomaly countermeasures count, the service list, and the anomaly countermeasures table.

The to-be-stopped service list is a data table, for example as illustrated in FIG. 8. As illustrated in FIG. 8, the to-be-stopped service list associates Anomaly countermeasures count, Virtual machine number, Priority degree, Service name, and Change setting/Stop, with each other.

For example, if the anomaly countermeasures count obtained is 0, determiner 70 reads, from the anomaly countermeasures table, the anomaly countermeasures process "Change settings of services of priority degree 1" corresponding to the anomaly countermeasures count "0." Based on the detection result information obtained, determiner 70 determines that the anomaly detector that has detected the security anomaly is a network IDS. Based on the vehicle information obtained, determiner 70 determines that vehicle 4 is running. Determiner 70 then extracts "Out-of-vehicle communication" and "Firewall" from the service list, which are the services with the priority degree "1," the category "Network" or "Security," and the vehicle state "–." Determiner 70 determines that "Out-of-vehicle communication" and "Firewall" are the specific services that need changes in settings, and adds these services to the to-be-stopped service list.

Instructor 72 outputs, based on the result of determination by determiner 70, an anomaly countermeasures instruction to one of anomaly countermeasures executers 44, 50, and 56 that is to address a detected security anomaly. The instruction instructs the anomaly countermeasures executer to stop, or change settings of, specific services determined by determiner 70.

Assume that, for example, instructor 72 outputs an anomaly countermeasures instruction to anomaly countermeasures executer 44 that is to address a detected security anomaly, thereby instructing to stop, or change settings of, specific services determined by determiner 70. Anomaly countermeasures executer 44 may then generate a replicate guest virtual machine (an example of a replicated operating system) by replicating guest virtual machine 36 in which the security anomaly has been detected. In this manner, upon attack on guest virtual machine 36 for example, the replicate guest virtual machine can take over the role of the target of the attack. Meanwhile, settings (e.g., the IP address) of original guest virtual machine 36 can be changed to reduce the possibility of being attacked. Alternatively, a replicate guest virtual machine may be provided in advance instead of being dynamically generated.

3. General Operations of Integrated ECU

Figure 9:
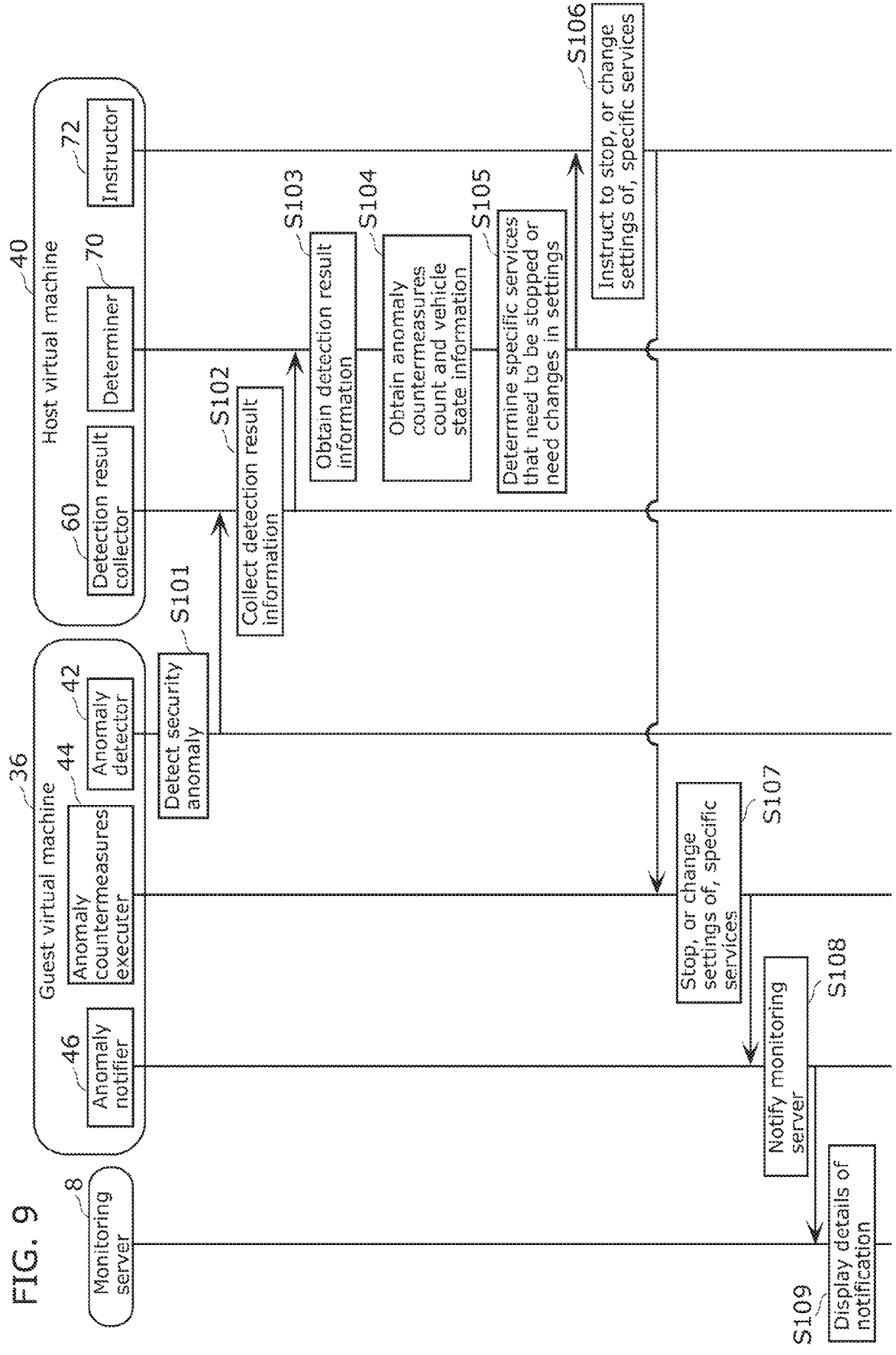
FIG. 9 is a sequence diagram illustrating the process of general operations of the integrated ECU according to the embodiment.

Now, with reference to FIG. 9, general operations of integrated ECU 10 (the monitoring system) will be described. FIG. 9 is a sequence diagram illustrating the process of general operations of integrated ECU 10 according to the embodiment.

The following describes a case in which a security anomaly is detected in guest virtual machine 36. As illustrated in FIG. 9, anomaly detector 42 of guest virtual machine 36 detects a security anomaly in guest virtual machine 36 (S101). Detection result collector 60 of host virtual machine 40 collects the detection result information from anomaly detector 42 (S102).

Determiner 70 of host virtual machine 40 obtains the detection result information from detection result collector 60 (S103) and obtains the vehicle state information and the anomaly countermeasures count from vehicle state obtainer 62 and anomaly countermeasures counter 64, respectively (S104).

Based on the detection result information, the vehicle state information, and the anomaly countermeasures count, determiner 70 refers to the service list and the anomaly countermeasures table to determine, from among the plurality of services indicated in the service list, specific services that need to be stopped or need changes in settings in order to resolve the security anomaly (S105).

Based on the result of the determination by determiner 70, instructor 72 of host virtual machine 40 outputs an anomaly countermeasures instruction to anomaly countermeasures executer 44 of guest virtual machine 36 in which the security anomaly has been detected (S106); the instruction instructs anomaly countermeasures executer 44 to stop, or change settings of, the specific services determined by determiner 70. In accordance with the anomaly countermeasures instruction from instructor 72, anomaly countermeasures executer 44 of guest virtual machine 36 executes an anomaly countermeasures process of stopping the specific services or changing their settings (S107).

Anomaly notifier 46 of guest virtual machine 36 notifies monitoring server 8 of information, such as information indicating the details of the detected security anomaly and the details of the anomaly countermeasures process (S108). This allows a display of monitoring server 8 to show the details of the notification from anomaly notifier 46 (S109).

The embodiment has described the case in which a security anomaly is detected in guest virtual machine 36. Processing similar to that described above is performed in cases in which a security anomaly is detected in guest virtual machine 38 or host virtual machine 40.

4. Operations of Determiner

Figure 10:
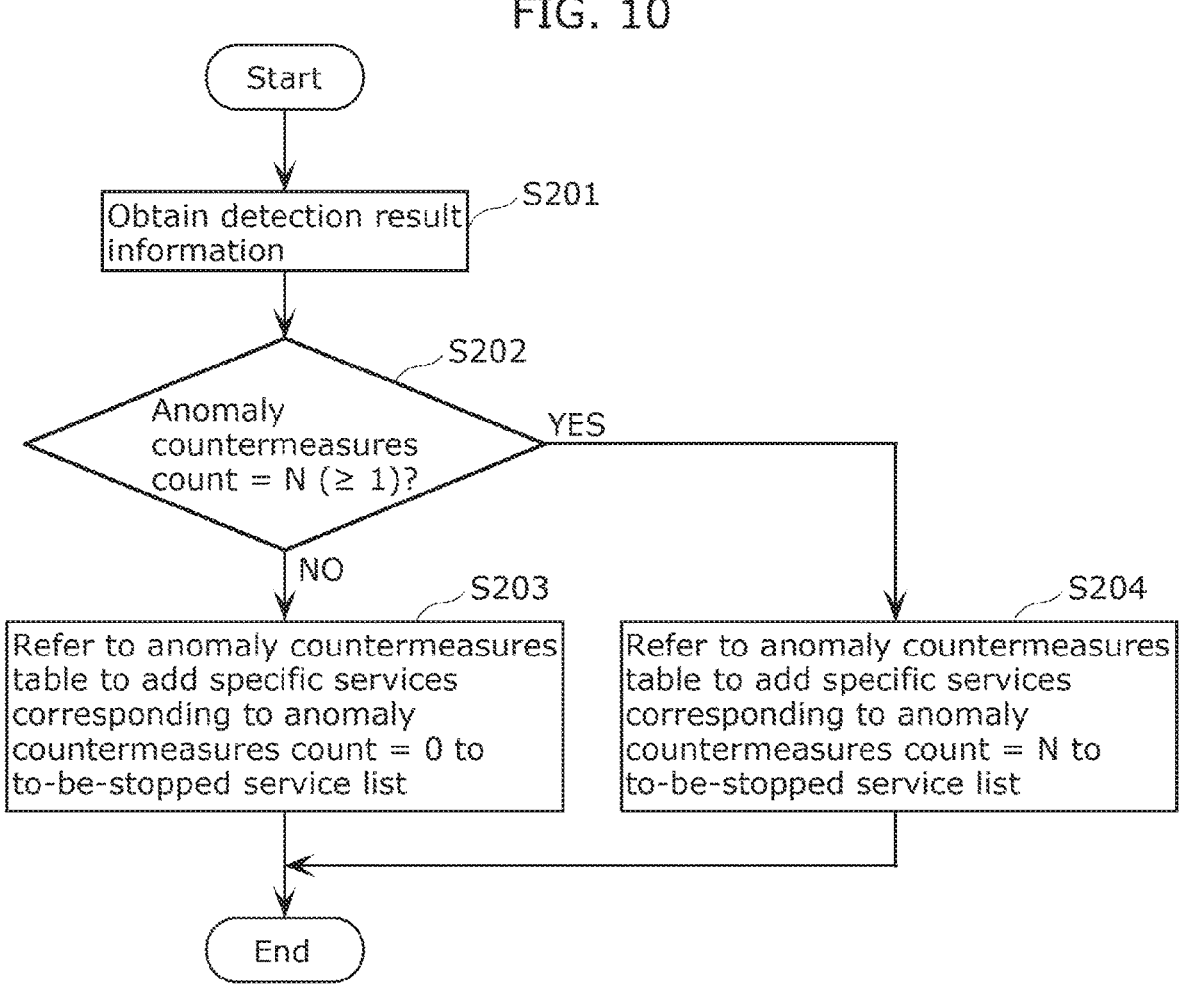
FIG. 10 is a flowchart illustrating the process of operations of the determiner of the integrated ECU according to the embodiment.
Figure 11:
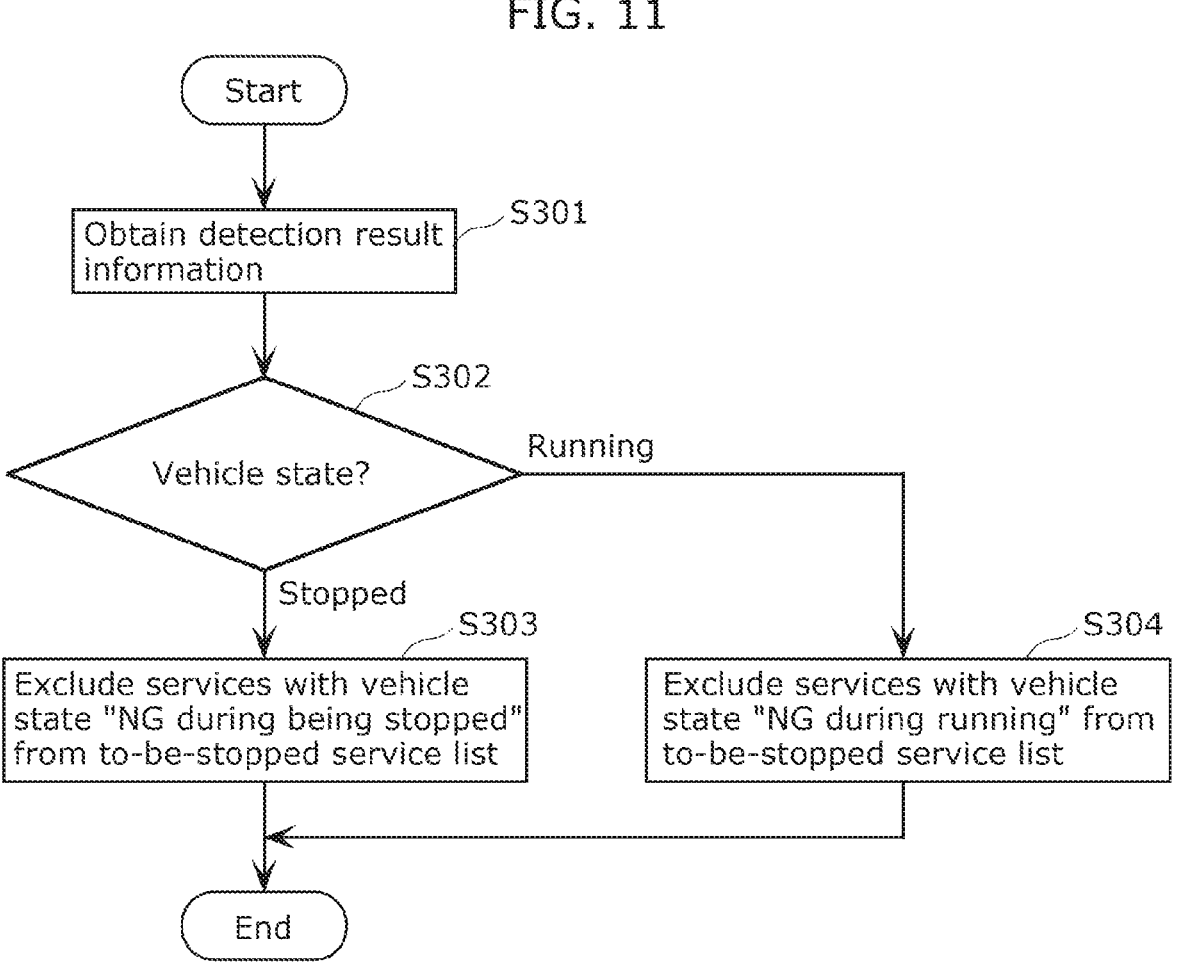
FIG. 11 is a flowchart illustrating the process of operations of the determiner of the integrated ECU according to the embodiment.
Figure 12:
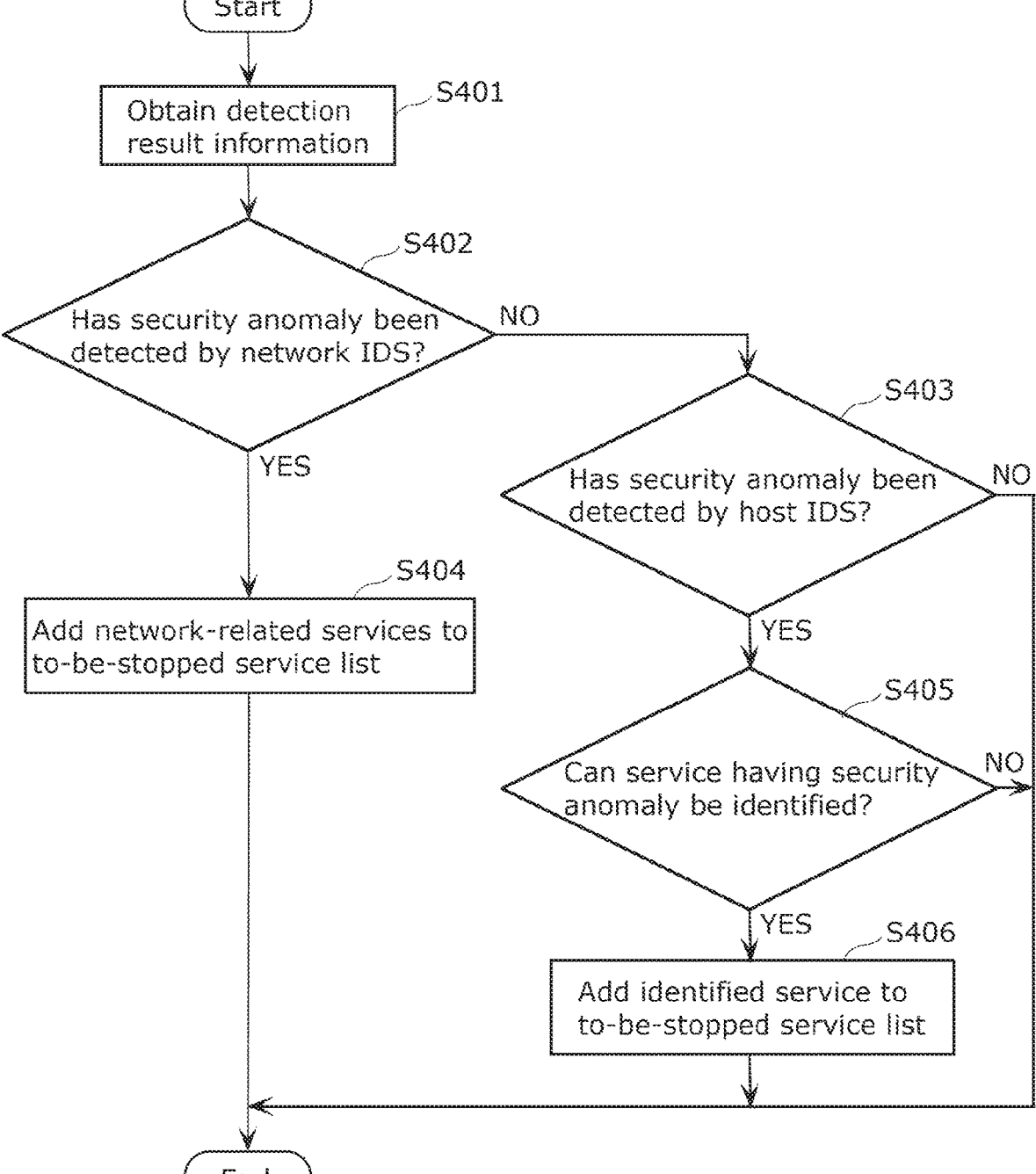
FIG. 12 is a flowchart illustrating the process of operations of the determiner of the integrated ECU according to the embodiment.
Figure 13:
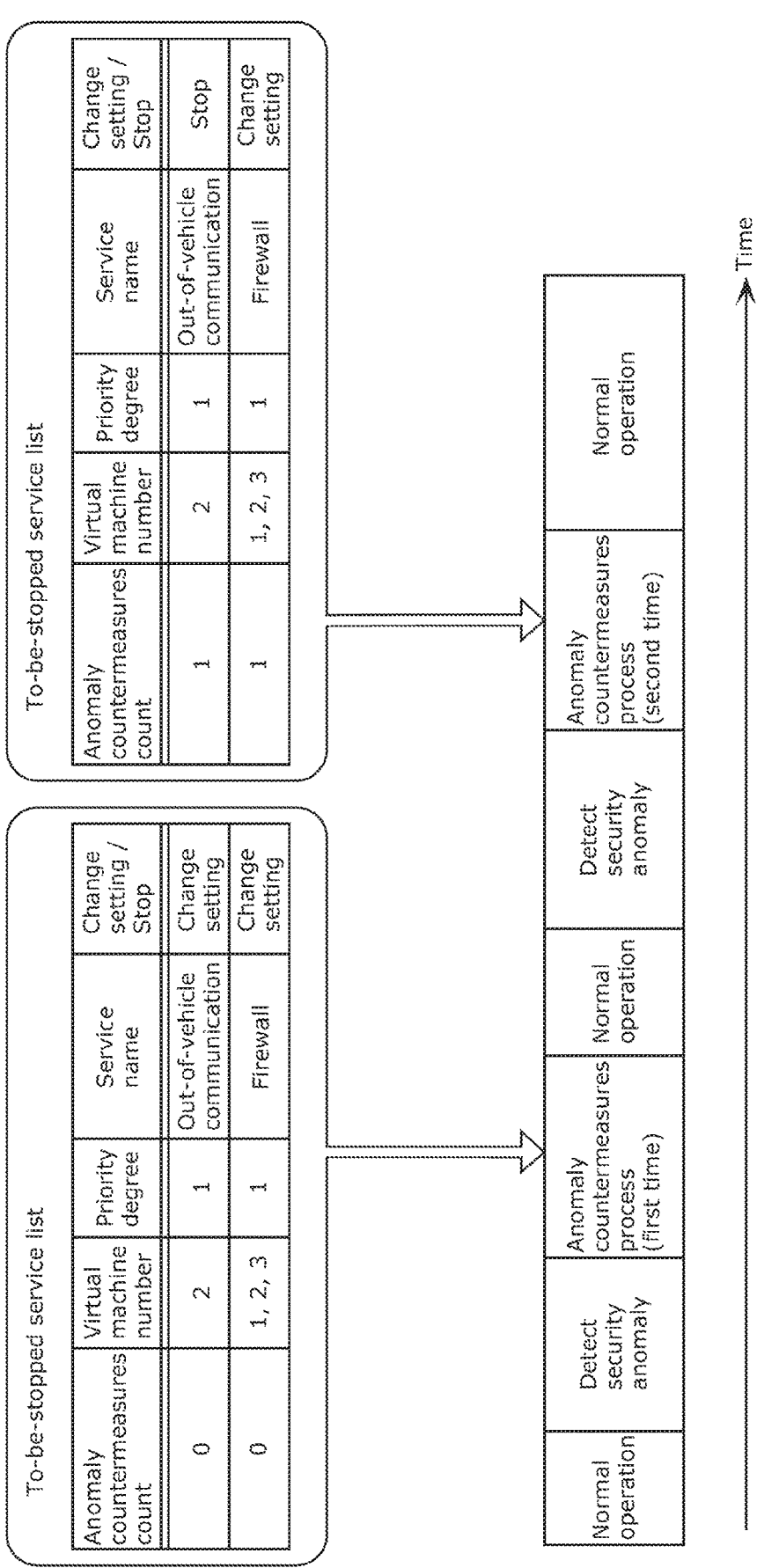
FIG. 13 is a diagram for describing operations of the determiner of the integrated ECU according to the embodiment.

Now, with reference to FIGS. 10 to 13, operations of determiner 70 of integrated ECU 10 will be described. FIGS. 10 to 12 are flowcharts illustrating the processes of operations of determiner 70 of integrated ECU 10 according to the embodiment. FIG. 13 is a diagram for describing operations of determiner 70 of integrated ECU 10 according to the embodiment.

As illustrated in FIG. 10, determiner 70 obtains the detection result information from detection result collector 60 (S201). Determiner 70 obtains the anomaly countermeasures count from anomaly countermeasures counter 64 to determine whether the anomaly countermeasures count is N (≥1) (S202).

If the anomaly countermeasures count is 0 (NO at S202), determiner 70 reads the anomaly countermeasures process corresponding to the anomaly countermeasures count "0" from the anomaly countermeasures table and adds the relevant specific services to the to-be-stopped service list (S203).

If the anomaly countermeasures count is N (YES at S202), determiner 70 reads the anomaly countermeasures process corresponding to the anomaly countermeasures count "N" from the anomaly countermeasures table and adds the relevant specific services to the to-be-stopped service list (S204).

As illustrated in FIG. 11, determiner 70 obtains the detection result information from detection result collector 60 (S301). Determiner 70 obtains the vehicle state information from vehicle state obtainer 62 to determine whether vehicle 4 is running or stopped (S302).

If vehicle 4 is stopped ("Stopped" at S302), determiner 70 excludes, from the to-be-stopped service list, the services with the vehicle state "NG during being stopped" among the plurality of services indicated in the service list (S303). That is, determiner 70 avoids selecting, as the specific services that need to be stopped or need changes in settings, the services with the vehicle state "NG during being stopped" among the plurality of services indicated in the service list.

If vehicle 4 is running ("Running" at S302), determiner 70 excludes, from the to-be-stopped service list, the services with the vehicle state "NG during running" among the plurality of services indicated in the service list (S304). That is, determiner 70 avoids selecting, as the specific services that need to be stopped or need changes in settings, the services with the vehicle state "NG during running" among the plurality of services indicated in the service list.

As illustrated in FIG. 12, determiner 70 obtains the detection result information from detection result collector 60 (S401). Based on the detection result information, determiner 70 determines the type of the anomaly detector that has detected the security anomaly (S402 and S403).

If the anomaly detector that has detected the security anomaly is a network IDS (YES at S402), determiner 70 adds, to the to-be-stopped service list, the services with the category "Network" among the plurality of services indicated in the service list (S404).

IF the anomaly detector that has detected the security anomaly is a host IDS (NO at S402 and YES at S403), determiner 70 determines whether the service in which the security anomaly has occurred can be identified (S405). If the service in which the security anomaly has occurred can be identified (YES at S405), determiner 70 adds the identified service to the to-be-stopped service list (S406). If the service in which the security anomaly has occurred cannot be identified (NO at S405), determiner 70 terminates the process.

Returning to step S402, if the anomaly detector that has detected the security anomaly is neither a network IDS nor a host IDS (NO at S402 and NO at S403), determiner 70 terminates the process.

The to-be-stopped service list generated as described above is used as follows. As illustrated in FIG. 13, assume that anomaly detector 42 of guest virtual machine 36, for example, detects a security anomaly while integrated ECU 10 has been operating normally. At this point, the anomaly countermeasures count is 0. Determiner 70 therefore reads the anomaly countermeasures process corresponding to the anomaly countermeasures count "0" from the anomaly countermeasures table and adds the relevant specific services to the to-be-stopped service list. Accordingly, anomaly countermeasures executer 44 of guest virtual machine 36 executes the anomaly countermeasures process of, for example, changing settings of the services "Out-of-vehicle communication" and "Firewall" added to the to-be-stopped service list. Here, anomaly countermeasures counter 64 of host virtual machine 40 increments the anomaly counter-measures count from "0" to "1."

Then, assume that anomaly detector 42 of guest virtual machine 36, for example, again detects a security anomaly after some time period of normal operation of integrated ECU 10. At this point, the anomaly countermeasures count is 1. Determiner 70 therefore reads the anomaly counter-measures process corresponding to the anomaly counter-measures count "1" from the anomaly countermeasures table and adds the relevant specific services to the to-be-stopped service list. Accordingly, anomaly countermeasures executer 44 of guest virtual machine 36 executes the anomaly countermeasures process of, for example, stopping the service "Out-of-vehicle communication" added to the to-be-stopped service list, and changing a setting of the service "Firewall" added to the to-be-stopped service list. Here, anomaly countermeasures counter 64 of host virtual machine 40 increments the anomaly countermeasures count from "1" to "2." It is to be noted that, for the anomaly countermeasures count 1, only the specific services relevant to the anomaly countermeasures process corresponding to the anomaly countermeasures count "1" in the anomaly countermeasures table may be added to the to-be-stopped service list. Alternatively, the specific services relevant to the anomaly countermeasures processes corresponding to the respective anomaly countermeasures counts "0" and "1" in the anomaly countermeasures table may be added to the to-be-stopped service list.

Once the security anomaly is completely resolved, integrated ECU 10 operates normally. Processing similar to that described above is repeated if any of anomaly detectors 42, 48, and 54 detects a security anomaly.

5. Advantageous Effect

In the embodiment, upon detection of a security anomaly by any of anomaly detectors 42, 48, and 54, determiner 70 determines, from among the plurality of services indicated in the service list, specific services that need to be stopped or need changes in settings in order to resolve the security anomaly.

Thus, an anomaly countermeasures process is executed that stops, or change settings of, the minimum number of specific services, for example those likely to be vulnerable. This can minimize the influences of executing the anomaly countermeasures process on functions of vehicle 4.

6. Variation

FIG. 14 is a diagram illustrating an example of the anomaly countermeasures table according to a variation of the embodiment. As illustrated in FIG. 14, the first row of the anomaly countermeasures table associates the anomaly countermeasures count "0" with the anomaly countermeasures process "Stop all the services and then sequentially start the services of priority degree 4. After a predetermined time period, sequentially start the services of priority degree 3. After a further predetermined time period, sequentially start the services of priority degree 2. After a further predetermined time period, sequentially start services of priority degree 1."

That is, the first row of the anomaly countermeasures table specifies, for the anomaly countermeasures count 0, the anomaly countermeasures process of stopping all the services and then sequentially starting the services in ascending order of priority degree.

The second row of the anomaly countermeasures table associates the anomaly countermeasures count "1" with the anomaly countermeasures process "Stop all the services and then sequentially start the services, except the services of priority degree M, in ascending order of priority degree". Priority degree M is the priority degree of a service in which a security anomaly is detected when the anomaly counter-measures count is 0. For example, priority degree M=2 means that a security anomaly is detected upon start of a service of priority degree 2, while services are started in the order of priority degree 4, priority degree 3, and priority degree 2 with the anomaly countermeasures count being 0.

That is, the second row of the anomaly countermeasures table specifies, for the anomaly countermeasures count 1, the anomaly countermeasures process of stopping all the services and then sequentially starting the services, except the services of priority degree M, in ascending order of priority degree. For example, for priority degree M=2, this process means sequentially starting services in the order of priority degree 4, priority degree 3, and priority degree 1.

Other Variations

Although the monitoring system according to one or more aspects of the present disclosure has been described based on the above embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

Although the above embodiment has described an application of the present disclosure as security measures for automobiles (vehicles), the application range of the present disclosure is not limited to this. For example, the present disclosure may be applied to not only automobiles but also various other mobility types, such as construction machinery, agricultural machinery, watercraft, trains, and aircraft.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

It is also possible that a part or all of the functions of the monitoring system according to Embodiment is realized by executing a computer program by means of a program executing unit, such as a Central Processing Unit (CPU).

It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

The present disclosure may be the above-above described methods. These methods may be a computer program executed by a computer, or digital signals forming the computer program. The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray (trademark) Disc), and a semiconductor memory. The present disclosure may be the digital signals recorded on the recording medium. The present disclosure may be implemented by transmitting the computer program or the digital signals via an electric communication line, a wired or wireless communication line, a network represented by the Internet, data broadcasting, and the like. The present disclosure may be a computer system including a microprocessor and a memory. The memory stores the computer program and the microprocessor operates according to the computer program. It is also possible that the program or the digital signals may be recorded onto the recording medium to be transferred, or may be transmitted via a network or the like, so that the program or the digital signals can be executed by a different independent computer system.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-071248 filed on Apr. 25, 2023.

INDUSTRIAL APPLICABILITY

The monitoring system according to the present disclosure is applicable to, for example, integrated ECUs having the function of monitoring an in-vehicle system provided in a vehicle.

The invention claimed is:

1. A monitoring system for monitoring an in-vehicle system provided to a vehicle, the monitoring system being included in the in-vehicle system, the monitoring system comprising:

a processor; and a memory including at least set of instructions that, when executed by the processor, causes the processor to perform operations, the operations including:

detecting a security anomaly in an operating system included in the monitoring system, the security anomaly including an unauthorized access to the vehicle;

determining a specific service from among a plurality of services indicated in a service list indicating a list of the plurality of services executed by the in-vehicle system when the security anomaly is detected, the specific service being a service to be stopped or to be changed in a setting in order to resolve the security anomaly; and executing an anomaly countermeasures process of stopping the specific service or changing the setting of the specific service, based on a determination result;

counting an anomaly countermeasures count that is a total number of times that the anomaly countermeasures process has been executed in a predetermined time period;

determining the specific service from among the plurality of services indicated in the service list, based on the anomaly countermeasures count; and obtaining vehicle status information indicating, as a state of the vehicle, whether the vehicle is running or stopped, wherein in the service list, each of the plurality of services is associated with whether the service is stoppable while the vehicle is running or stopped, and based on the anomaly countermeasures count and the vehicle status information, the determining by the processor does not select as the specific service a service not stoppable while the vehicle is running or stopped from among the plurality of services indicated in the service list.

2. The monitoring system according to claim 1, wherein:

the determining by the processor further includes determining the specific service from among the plurality of services indicated in the service list, based on the anomaly countermeasures process associated with the anomaly countermeasures count counted with reference to an anomaly countermeasures table indicating a correspondence between the anomaly countermeasures count and the anomaly countermeasures process.

3. The monitoring system according to claim 1, wherein:

the determining by the processor further includes determining the specific service from among the plurality of services indicated in the service list, based on the anomaly countermeasures count and the vehicle status information.

4. The monitoring system according to claim 1 wherein:

the processor further performs operations including notifying that the specific service is stopped or the setting of the specific service is changed, when the specific service is stopped or the setting of the specific service is changed.

5. The monitoring system according to claim 4, wherein when the security anomaly is resolved, the notifying by the processer further includes notifying details of the anomaly countermeasures process executed.

6. The monitoring system according to claim 1, wherein when the security anomaly is detected, the processor further performs operations including generating a replicated operating system that is a replication of the operating system in which the security anomaly has been detected.

7. The monitoring system according to claim 1, wherein in the service list, each of the plurality of services indicated in the service list is associated with a numerical value representing a degree of priority the specific service is to be stopped or the setting thereof is to be changed, and the determining by the processor further includes determining the specific service from among the plurality of services indicated in the service list, based on the degree of priority.

8. The monitoring system according to claim 1, wherein in the service list, the plurality of services are classified into categories including at least one of a network, a device, a vehicle function, a vehicle safety function, or security.

9. A control method performed by a monitoring system for monitoring an in-vehicle system provided to a vehicle, the monitoring system being included in the in-vehicle system, the control method comprising:

(a) detecting a security anomaly in an operating system included in the monitoring system;

(b) determining, when the security anomaly is detected in (a), a specific service from among a plurality of services indicated in a service list indicating a list of the plurality of services executed by the in-vehicle system, the specific service being a service which needs to be stopped or needs a change in a setting in order to resolve the security anomaly;

(c) executing an anomaly countermeasures process of stopping the specific service or changing the setting of the specific service, based on a determination result of (b); and (d) counting an anomaly countermeasures count that is a total number of times that the anomaly countermeasures process has been executed in a predetermined time period in (c);

(e) determining the specific service from among the plurality of services indicated in the service list, based on the anomaly countermeasures count counted in (d); and (f) obtaining vehicle status information indicating, as a state of the vehicle, whether the vehicle is running or stopped, wherein in the service list, each of the plurality of services is associated with whether the service is stoppable while the vehicle is running or stopped, and based on the anomaly countermeasures count and the vehicle status information, the determining does not select as the specific service a service not stoppable while the vehicle is running or stopped from among the plurality of services indicated in the service list.

*    *    *    *    *